Patented Mar. 10, 1925.

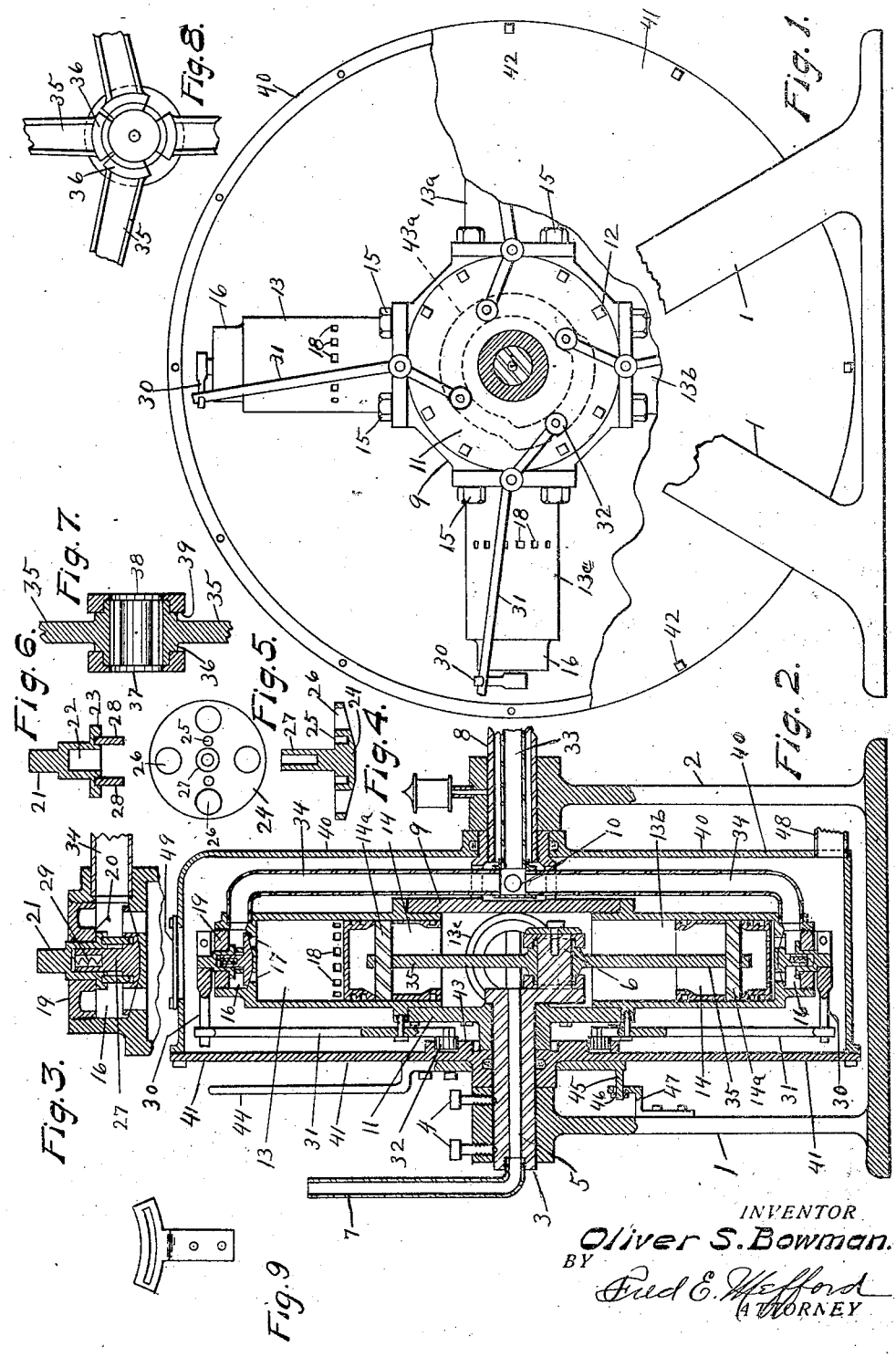

1,529,111

UNITED STATES PATENT OFFICE.

OLIVER S. BOWMAN, OF COLORADO SPRINGS, COLORADO.

ROTARY STEAM ENGINE.

Application filed November 7, 1922. Serial No. 599,539.

*To all whom it may concern:*

Be it known that I, OLIVER S. BOWMAN, a citizen of the United States, and a resident of Colorado Springs, in the county of El Paso and State of Colorado, have invented a new and useful Rotary Steam Engine, of which the following is a specification.

My invention relates to rotary steam engines and has for its object the provision of an engine of this type having improved means for the intake and exhaust, including a novel valve with operating mechanism; improved means for mounting and retaining a plurality of connecting rods on a common crank pin; an improved engine case, comprising means to operate the engine within a vacuum, and to reverse the engine. Other objects will appear as the description progresses.

In the accompanying drawings, I have shown a preferred embodiment of my invention but I do not limit myself to the exact form shown but wish it understood that I contemplate various adaptations and changes in the details of construction, within the scope of the claims.

Fig. 1 represents a side elevation of my invention, the disc 40 and standard 1 being partly broken away; Fig. 2, an elevation of a vertical cross section of the invention thru the center looking in the direction of the arrow in Fig. 1; Fig. 3, a fragmentary sectional view of a cylinder head and valve chamber contents; Fig. 5, a plan view of the valve; Fig. 4, a vertical cross section of the valve, thru the center; Fig. 6, a vertical cross section of a rod and dowels, thru the center; Fig. 7, a fragmentary cross sectional view of two connecting rods and retaining collars; Fig 8, a fragmentary elevation of the connecting rods disposed on the crank, one retaining collar being removed, and Fig. 9, an elevation of the quadrant. Figs. 3, 4, 5, 6, 7, and 8 are drawn to an enlarged scale.

The invention comprises two supporting standards 1 and 2; a crank shaft 3, mounted in standard 1 and held fixed therein by set screws 4 having a longitudinal conduit 5 therethru and a crank 6 thereon; a vertical filling pipe 7 fitted into conduit 5; a hollow shaft 8 journalled in standard 2; a crank case 9, rotatably mounted on crank shaft 3 and rigidly mounted on hollow shaft 8 having a hollow hub 10 with a plurality of radially disposed holes therein and a cover plate 11 bolted thereto by bolts 12; a plurality of cylinders 13, 13ª, 13ᵇ and 13ᶜ, mounted radially on crank case 9, by bolts 15 each cylinder having a valve chamber 16, with a plurality of communicating ports 17, in its head and a circle of holes 18 in its wall; a plug 19, screwed into each valve chamber 16 having a bearing therethru and a seat 20 concentric therewith, on its inner face; a rod 21, journalled in each plug 19 having a recess 22 therein and a flange 23 thereon; a valve, seated in each valve chamber 16 comprising a disc 24, having dowel recesses 25 therein and a plurality of ports 26 therethru and a hollow stem 27 disposed in a blind chamber 22; dowels 28 fixed in flanges 23 and extending into dowel recesses 25; an open spring 29 disposed in each hollow stem 27; a valve lever 30 rigidly mounted on each rod 21; a rocker lever 31, mounted on each cylinder and connected to a valve lever 30; a pipe 33, extending thru hollow shaft 8, without contact therewith having a plurality of branch pipes 34 extending therefrom thru the radially disposed holes in crank case hub 10 without contact therewith into valve chambers 16; pistons 14, with wrist pins 14ª disposed in said cylinders; connecting rods 35, mounted on crank 6 and connected to wrist pins 14ª each having a sector of a hub 36 with convex, concave and thrustbearing surfaces thereon, held in position on said crank by retaining collars 37 and 38 each having an interior bearing surface and an interior flange 39 having a bearing surface adjacent to said hub sectors; a cylindrical case 40, mounted on crank shaft 6 and on crank case hub 10 having a disc 41 bolted thereto by bolts 42 having a cam 43 integral therewith adapted to cooperate with followers 32; a lever 44 mounted on disc 41 having a threaded pin 45 carrying nut 46, disposed in a slot in quadrant 47 mounted on standard 1; a conduit 48 connected to case 40, and a cover 49 for the hand hole in case 40.

Pipe 33 is adapted to support a suitable rotating packing connected to the main steam line.

Open spring 29, within hollow stem 27, maintains disc 24 seated above ports 17 and flange 23 against the inner face of plug 19. When in operation, the steam pressure supplements the pressure of said spring.

The shape of cam 43 is indicated by the dotted lines 43ª in Fig. 1 altho the cam is a part of the fragment broken away.

As the cylinders revolve, the action of cam 43 on followers 32, causes rocker levers 31 to swing valve levers 30, thereby opening and closing communicating ports 17.

Steam enters pipe 33 and from thence flows thru branch pipes 34 into valve chambers 16 and is admitted serially to the cylinders thru communicating ports 17 when a cylinder is in the position shown by cylinder 13ᵇ and exhausts thru holes 18, directly into case 40, when a cylinder is in the position shown by cylinder 13 and from thence thru conduit 48 into a condenser.

When operating condensing, a vacuum will be automatically maintained in case 40, equal to that existing in the condenser. When operating noncondensing, the steam is exhausted from case 40 directly into the atmosphere thru any suitable exit leading from conduit 48.

Oil to lubricate cylinders, wrist pins and crank pin, is admitted to crank case 9 thru pipe 7 and conduit 5.

The engine is reversed by changing the position of cam 43, which is accomplished by lever 44, attached to disc 41. During operation of the engine, case 40 is held rigid by nut 46 on pin 45 disposed in quadrant 47.

I claim:

1. In an engine of the class described, including in combination, a pair of standards; a hollow shaft journalled in one of said standards; a crank shaft fixed in the other standard having a longitudinal conduit therethru and a crank thereon; a vertical pipe fitted into said conduit; a crank case, mounted rotatably on said fixed crank shaft and rigidly on said hollow shaft comprising a hollow hub, having a plurality of holes radially disposed therein, and a cover plate; a plurality of cylinders, having pistons therein, mounted radially on said crank case each cylinder having a circle of holes in its wall and a valve chamber in its head, said cylinder having a plurality of ports in communication with said valve chamber; and a plug, screwed into said valve chamber having a bearing therethru and a seat concentric therewith on its inner face; for the purposes set forth.

2. In an engine of the class described, including in combination, a pair of standards; a hollow shaft journalled in one of said standards; a crank shaft fixed in the other standard having a longitudinal conduit therethru and a crank thereon; a vertical pipe fitted into said conduit; a crank case, mounted rotatably on said fixed crank shaft and rigidly on said hollow shaft comprising a hollow hub, having a plurality of holes radially disposed therein, and a cover plate; a plurality of cylinders, having pistons therein, mounted radially on said crank case each cylinder having a circle of holes in its wall and a valve chamber in its head, said cylinder having a plurality of ports in communication with said valve chamber; a plug, screwed into said valve chamber having a bearing therethru and a seat concentric therewith on its inner face; a rod, journalled in said plug having a recess therein and a flange thereon; a valve, seated in said valve chamber comprising a disc, having dowel recesses therein and ports therethru, and a hollow stem disposed in said recess; dowels fixed in said flange and extending into said dowel recesses, and an open spring disposed in said hollow stem; for the purposes set forth.

3. In an engine of the class described, including in combination, a pair of standards; a hollow shaft journaled in one of said standards; a crank shaft fixed in the other standard having a longitudinal conduit therethru and a crank thereon; a vertical pipe fitted into said conduit; a crank case, mounted rotatably on said fixed crank shaft and rigidly on said hollow shaft comprising a hollow hub, having a plurality of holes radially disposed therein, and a cover plate; a plurality of cylinders, having pistons therein, mounted radially on said crank case each cylinder having a circle of holes in its wall and a valve chamber in its head, said cylinder having a plurality of ports in communication with said valve chamber; a plug, screwed into said valve chamber having a bearing therethru and a seat concentric therewith on its inner face; a rod, journalled in said plug having a recess therein and a flange thereon; a valve, seated in said valve chamber comprising a disc, having dowel recesses therein and ports therethru, and a hollow stem disposed in said recess; dowels fixed in said flange and extending into said dowel recesses; an open spring disposed in said hollow stem; a valve lever mounted on said rod, and a rocker lever, mounted on each of said cylinders and connected to said valve lever having a follower on the short arm thereof; for the purposes set forth.

4. In an engine of the class described, including in combination, a pair of supports; a hollow shaft journalled in one of said supports; a crank shaft fixed in the other support having a longitudinal conduit therethru and a crank thereon; a vertical pipe fitted into said conduit; a crank case, mounted rotatably on said fixed crank shaft and rigidly on said hollow shaft comprising a hollow hub, having a plurality of holes radially disposed therein, and a cover plate; a plurality of cylinders, with pistons therein, mounted radially on said crank case each cylinder having a circle of holes in its wall and a valve chamber in its head, said cylinder having a plurality of ports in communication with said valve chamber; a plug, screwed into said valve chamber having a bearing therethru and a seat concentric therewith on its inner face; a rod, journalled in said plug having a recess therein and a flange thereon; a valve, seated in said valve chamber comprising a disc having dowel recesses therein and ports therethru and a hollow stem disposed in said recess; dowels fixed in said flanges and extending into said dowel recesses; an open spring disposed in each hollow stem; a valve lever mounted on each of said rods; a rocker lever, mounted on each of said cylinders and connected to one of said rods having a follower on the short arm thereof; and a plurality of connecting rods, supported on said crank and connected to said pistons each comprising a sector of a hub having convex, concave and thrust bearing surfaces; for the purposes set forth.

5. In an engine of the class described, including in combination, a pair of supports; a hollow shaft journalled in one of said supports; a crank shaft fixed in the other support having a longitudinal conduit therethru and a crank thereon; a vertical pipe fitted into said conduit; a crank case, mounted rotatably on said fixed crank shaft and rigidly on said hollow shaft comprising a hollow hub, having a plurality of holes radially disposed therein, and a cover plate; a plurality of cylinders, having pistons therein, mounted radially on said crank case each cylinder having a circle of holes in its wall and a valve chamber in its head, said cylinder having a plurality of ports in communication with said valve chamber; a plug, screwed into said valve chamber having a bearing therethru and a seat concentric therewith on its inner face; a rod, journalled in said plug having a recess therein and a flange thereon; a valve, seated in said valve chamber comprising a disc, having dowel recesses therein and ports therethru, and a hollow stem disposed in said recess; dowels fixed in said flange and extending into said dowel recesses; an open spring disposed in said hollow stem; a valve lever mounted on each of said rods; a rocker lever, mounted on each of said cylinders and connected to said valve levers having a follower on the short arm thereof; a plurality of connecting rods, supported on said crank and connected to said pistons each comprising a sector of a hub, having convex, concave and thrust bearing surfaces, and a pair of retaining collars, enclosing said hub sectors each having an interior bearing surface and an interior flange having a bearing surface; for the purposes set forth.

6. In an engine of the class described, including in combination, a pair of standards; a hollow shaft journalled in one of said standards; a crank shaft fixed in the other standard having a longitudinal conduit therethru and a crank thereon; a vertical pipe fitted into said conduit; a crank case, mounted rotatably on said fixed crank shaft and rigidly on said hollow shaft comprising a hollow hub, having a plurality of holes radially disposed therein, and a cover plate; a plurality of cylinders, with pistons therein, mounted radially on said crank case each cylinder having a circle of holes in its wall and a valve chamber in its head, said cylinder having a plurality of ports in communication with said valve chamber; a plug screwed into said valve chamber having a bearing therethru and a seat concentric therewith on its inner face; a rod, journalled in each of said plugs having a recess therein and a flange thereon; a valve seated in each valve chamber, comprising a disc, having dowel recesses therein and ports therethru, and a hollow stem disposed in said recess; dowels fitted in said flange and extending into said dowel recesses; open springs disposed in said hollow stems; valve levers mounted on said rods; rocker levers mounted on said cylinders and connected to said rods having followers on the short arms thereof; a plurality of connecting rods, supported on said crank and connected to said pistons each comprising a sector of a hub having convex, concave and thrust bearing surfaces; a pair of retaining collars enclosing said sectors of hubs each having an interior bearing surface and an interior flange having a bearing surface, and a rotatable pipe, extending thru said hollow shaft, without contact therewith having a plurality of branch pipes extending therefrom thru the radially disposed holes in said crank case hub, without contact therewith, into said valve chambers; for the purposes set forth.

7. In an engine of the class described, including in combination, a pair of standards; a hollow shaft journalled in one of said standards; a crank shaft fixed in the other standard having a longitudinal conduit therethru and a crank thereon; a vertical pipe fitted into said conduit; a crank case, mounted rotatably on said fixed crank shaft and rigidly on said hollow shaft comprising a hollow hub, having a plurality of holes radially disposed therein, and a cover plate; a plurality of cylinders, with pistons therein, mounted radially on said crank case each cylinder having a circle of holes in its wall and a valve chamber in its head, said cylinder having a plurality of ports in communication with said valve chamber; a plug, screwed into each valve chamber having a bearing therethru and a seat concentric therewith on its inner face; a rod, journalled in each plug having a recess therein and a flange thereon;

a valve, seated in each valve chamber comprising a disc, having dowel recesses therein and ports therethru, and a hollow stem disposed in said recess; dowels fixed in said flanges and extending into said dowel recesses; an open spring disposed in each hollow stem; a valve lever mounted on each rod; a rocker lever, mounted on each cylinder and connected to a valve lever having a follower on the short arm thereof; a plurality of connecting rods, supported on said crank and connected to said pistons each comprising a sector of a hub, having convex, concave and thrust bearing surfaces; a pair of retaining collars enclosing said sectors of hubs each having an interior bearing surface and an interior flange having a bearing surface; a rotatable pipe, extending thru said hollow shaft, without contact therewith having a plurality of branch pipes extending therefrom thru the radially disposed holes in said crank case hub, without contact therewith, into said valve chambers, and a cylindrical case, mounted on said crank shaft and said crank case hub comprising a detachable disc having a cam integral therewith adapted to cooperate with said followers; for the purposes set forth.

8. In an engine of the class described, including in combination, a pair of standards; a hollow shaft journalled in one of said standards; a crank shaft fixed in the other standards having a longitudinal conduit therethru and a crank thereon; a vertical pipe fitted into said conduit; a crank case, mounted rotatably on said fixed crank shaft and rigidly on said hollow shaft comprising a hollow hub, having a plurality of holes radially disposed therein, and a cover plate; a plurality of cylinders, with pistons therein, mounted radially on said crank case each cylinder having a circle of holes in its wall and a valve chamber in its head, said cylinder having a plurality of ports in communication with said valve chamber; a plug, screwed into each valve chamber having a bearing therethru and a seat concentric therewith on its inner face; a rod, journalled in each plug having a recess therein and a flange thereon; a valve, seated in each valve chamber comprising a disc, having dowel recesses therein and ports therethru, and a hollow stem disposed in said recess; dowels fixed in said flanges and extending into said dowel recesses; an open spring disposed in each hollow stem; a valve lever mounted on each rod; a rocker lever, mounted on each cylinder and connected to a valve lever having a follower on the short arm thereof; a plurality of connecting rods, supported on said crank and connected to said pistons each comprising a sector of a hub having convex, concave and thrust bearing surfaces; a pair of retaining collars, enclosing said sectors of hubs each having an interior bearing surface and an interior flange having a bearing surface; a rotatable pipe, extending thru said hollow shaft, but not in contact therewith having a plurality of branch pipes extending therefrom thru the radially disposed holes in said crank case hub, but not in contact therewith, into said valve chambers; a cylindrical case, mounted on said crank case hub and said crank shaft comprising a detachable disc having a cam integral therewith adapted to cooperate with said followers; a lever attached to said cylindrical case, and a conduit connected to said case; for the purposes set forth.

9. In an engine of the class described, including in combination, a pair of supports; a hollow shaft journalled in one of said supports; a crank shaft fixed in the other support having a longitudinal conduit therethru and a crank thereon; a vertical pipe fitted into said conduit; a crank case, mounted rotatably on said crank shaft and rigidly on said hollow shaft comprising a hollow hub, having a plurality of holes radially disposed therein, and a cover plate; a plurality of cylinders, with pistons therein, mounted radially on said crank case each cylinder having a circle of holes in its wall and a valve chamber in its head, said cylinder having a plurality of ports in communication with said valve chamber; a plug, screwed into each valve chamber having a bearing therethru and a seat concentric therewith on its inner face; a rod, journalled in each plug having a recess therein and a flange thereon; a valve, seated in each valve chamber comprising a disc, having dowel recesses therein and ports therethru, and a hollow stem disposed in said recess; dowels fixed in said flanges and extending into said dowel recesses; an open spring disposed in each hollow stem; a valve lever mounted on each rod; a rocker lever, mounted on each cylinder and connected to a rod having a follower on the short arm thereof; and a disc, mounted on said fixed crank shaft having a cam thereon adapted to cooperate with said followers; for the purposes set forth.

10. In an engine of the class described, including in combination, a pair of standards; a hollow shaft journalled in one of said standards; a crank shaft fixed in the other standard having a crank thereon; a crank case mounted on said crank shaft and said hollow shaft; a plurality of cylinders, mounted radially on said crank case having valve chambers in the heads thereof and holes in the wall thereof; a rod, journalled in the head of each valve chamber having a recess therein; a valve, seated in each valve chamber having a plurality of ports therein and a stem disposed in the recess of said rod; an open spring disposed in said valve stem; dowel pins connecting said valve and said rod; a valve lever mounted on each rod; a rocker lever mounted on each cylinder and connected with a valve lever; a disc mounted on said crank shaft having a cam thereon adapted to cooperate with said rocker levers; and a pipe, extending thru said hollow shaft having a plurality of branch pipes extending therefrom into said valve chambers; for the purposes set forth.

11. In an engine of the class described, including in combination, a pair of standards; a crank shaft fixed in one of said standards having a crank thereon; a hollow shaft mounted in the other standard; a crank case mounted on said crank shaft and said hollow shaft; a plurality of cylinders, mounted radially on said crank case having valve chambers in the heads and holes in the wall thereof; a pipe, extending thru said hollow shaft having a plurality of branch pipes leading into said valve chambers; a rod, journaled in the head of each valve chamber having a recess therein and a flange thereon; a valve, seated in each valve chamber comprising a disc, having dowel recesses therein and ports therethru and a hollow stem disposed in said recess; an open spring disposed in said hollow stem; dowels fixed in said flanges and extending into said recesses; a valve lever mounted on said rod; a rocker lever mounted on each cylinder and connected to a valve lever; a disc, mounted on said crank shaft having a cam thereon adapted to cooperate with said rocker levers; for the purposes set forth.

12. In an engine of the class described, including in combination, a pair of standards; a hollow shaft journalled in one of said standards; a crank shaft fixed in the other standard, having a longitudinal conduit therethru and a crank thereon; a vertical transparent pipe fitted into said conduit; a crank case, mounted rotatably on said crank shaft and rigidly on said hollow shaft; a plurality of cylinders with pistons therein, mounted radially on said crank case each having a valve chamber, with a plurality of ports, in its head and a circle of holes in its wall; a plug, screwed into each valve chamber having a bearing therethru and a seat concentric therewith on its inner face; a rod, journalled in each plug having a recess therein and a flange thereon; a valve, seated in each valve chamber comprising a disc, having dowel recesses therein and ports therethru, and a hollow stem disposed in said recess; dowels fixed in said flanges and extending into said dowel recesses; open springs disposed in said hollow stems; valve levers mounted on said rods; rocker levers mounted on said cylinders and connected to said valve levers; a plurality of connecting rods mounted on said crank and connected to said pistons; a rotatable pipe extending thru said hollow shaft having a plurality of branch pipes extending therefrom into said valve chambers; a disc, mounted on said crank shaft having a cam thereon, adapted to cooperate with said rocker levers, and means for reversing; for the purposes set forth.

13. In an engine of the class described, including in combination, a pair of standards; a crank shaft fixed in one of said standards having a crank thereon; a hollow shaft journalled in the other standard; a crank case mounted rotatably on said crank shaft and rigidly on said hollow shaft; a plurality of cylinders, with pistons therein, mounted radially on said crank case each having a valve chamber, with a plurality of communicating ports, in its head and a circle of holes in its wall; a plug, screwed into each valve chamber having a bearing therethru; a rod, journalled in each plug having a recess therein and a flange thereon; a valve, seated in each valve chamber comprising a disc, having dowel recesses therein and ports therethru, and a hollow stem disposed in said recess; dowels fixed in said flange and extending into said dowel recesses; an open spring disposed in said hollow stem; a valve lever mounted on each rod; a rocker lever, mounted on each cylinder and connected to a valve lever having a follower on the short arm thereof; a plurality of connecting rods mounted on said crank shaft and connected to said pistons; a rotatable pipe, extending thru said hollow shaft having a plurality of branch pipes extending therefrom into said valve chambers, and a disc, mounted on said crank shaft having a cam thereon adapted to cooperate with said followers; for the purposes set forth.

14. In an engine of the class described, including in combination, a crank case adapted to be rotatably mounted on a fixed crank shaft and rigidly mounted on a rotatable hollow drive shaft of a rotary engine; a plurality of cylinders mounted radially on said crank case each cylinder having a circle of holes in its wall and a valve chamber in its head, said cylinder having a plurality of ports in communication with said valve chamber; plugs screwed into said valve chambers, each having a bearing therethru and a seat concentric therewith on its inner face; a rod journalled in each plug, having a recess therein and a flange thereon; a valve seated in each valve chamber, comprising a disc, having dowel recesses therein and ports therethru, and a hollow stem disposed in said recess; dowels fixed in said flanges and extending into said dowel recesses; and an open spring disposed in said hollow stem; for the purposes set forth.

OLIVER S. BOWMAN.